(12) United States Patent
Torrey

(10) Patent No.: US 6,457,005 B1
(45) Date of Patent: Sep. 24, 2002

(54) METHOD AND SYSTEM FOR REFERRAL MANAGEMENT

(75) Inventor: David R. Torrey, Palo Alto, CA (US)

(73) Assignee: Hotjobs.com, Ltd., New York, NY (US)

(*) Notice: Subject to any disclaimer, the term of this patent is extended or adjusted under 35 U.S.C. 154(b) by 0 days.

(21) Appl. No.: 09/474,379

(22) Filed: Dec. 29, 1999

Related U.S. Application Data

(60) Provisional application No. 60/139,627, filed on Jun. 17, 1999.

(51) Int. Cl.$^7$ ................................................ G06F 17/30
(52) U.S. Cl. ................................... 707/5; 705/5; 707/3
(58) Field of Search ............................... 707/5, 10, 102; 705/1; 725/116; 716/17; 379/357.03

(56) References Cited

U.S. PATENT DOCUMENTS

| | | | | |
|---|---|---|---|---|
| 5,832,497 A | * | 11/1998 | Taylor | 705/1 |
| 5,963,951 A | * | 10/1999 | Collins | 707/102 |
| 6,108,493 A | * | 8/2000 | Miller et al. | 707/2 |

OTHER PUBLICATIONS

HTML documents accessed via URL http://www.eggrock.com on Dec. 16, 1999.
HTML documents accessed via URL http://www.brooktrout.com on Dec. 16, 1999.
HTML documents accessed via URL http://www.jobswarm.com on Dec. 16, 1999.
HTML documents accessed via URL http://www.montster.com on Dec. 16, 1999.

* cited by examiner

Primary Examiner—Safet Metjahic
Assistant Examiner—Sana Al-hashemi
(74) Attorney, Agent, or Firm—David N. Lathrop, Esq.; Gallagher & Lathrop

(57) ABSTRACT

The solicitation and management of referrals is facilitated by methods that record in a database the descriptions of opportunities and the terms under which referral fees will be paid to parties that refer resources for consideration. In one application, opportunities are employment openings and resources are potential employees. Parties may search the database to discover opportunities along with the related referral-fee information, and may submit a referral that includes information describing a resource for consideration to satisfy an opportunity described in the database. A subsequent trigger event, such as a referred person being hired, initiates activities that allow a referring party to receive the referral fees that are due under the terms that are recorded in the database.

120 Claims, 5 Drawing Sheets

METHOD AND SYSTEM FOR REFERRAL MANAGEMENT

CROSS-REFERENCE TO RELATED APPLICATIONS

This application claims priority benefits of prior filed copending U.S. provisional application Ser. No. 60/139,627 filed Jun. 17, 1999, which is incorporated herein by reference.

TECHNICAL FIELD

The present invention is related generally to computers and networks and is related more particularly to methods and systems for using computers and networks to manage referrals.

BACKGROUND ART

There is a growing need in essentially all sectors of human endeavor including business, industry, government, education and science to find and acquire resources that can satisfy a wide variety of demands. One example is in the area of employment where, for some disciplines, the competition for qualified people is so intense that it is necessary to use search firms and recruiters to find and employ suitably qualified people. Another example is in the area of real estate where agents are frequently used to match selling or leasing opportunities with the particular needs of prospective buyers or lessors. The area of employment is illustrative and is discussed more fully in the following paragraphs.

There is a growing trend to use computers and networks to facilitate finding and acquiring resources. such as employees. For example, computers and networks like the Internet are already used to provide wide access to lists of employment opportunities that are maintained in databases. Various tools, generally known as search engines, are provided to facilitate searching the databases for employment opportunities that match a of criteria. Unfortunately, the extent to which these systems have helped attract qualified people to fill the listed employment opportunities has been disappointing.

Two ways by which companies have sought qualified employees is through recruiting firms and through employee-referral programs. Recruiting firms identify and refer candidates in exchange for an opportunity to receive a recruiting fee. Employee-referral programs solicit referrals by offering referral fees to people that are already employed by the company. These two ways may be adequate to satisfy employment opportunities in situations where there is an abundant supply of qualified people; however, they are proving to be inadequate in situations that require people with education, training, skills or experience that are either difficult to find or are in such great demand that the need exceeds the supply. A more extensive network of people who can refer potential employees is needed.

A similar need for such a referral network exists in other areas such as real estate, "matchmaking" in a social context, and auctions. At present, there is no known mechanism that can develop or manage such a network.

DISCLOSURE OF INVENTION

It is an object of the present invention to provide for a method and system that can be used to develop and manage a large referral network by which resources may be referred to entities that have need for such resources.

According to one aspect of the present invention, a method for managing referrals that includes receiving an opportunity description and related referral-payment information that represents terms for paying a resource-referral fee, and in response, generating an opportunity identifier that uniquely identifies the opportunity and recording in an opportunity database the opportunity description, the related referral-payment information and the opportunity identifier; receiving a search request and, in response, providing information from the opportunity database that is obtained from the opportunity description and the related referral-payment information; accepting a referral that includes a resource description that describes a resource, and in response, generating a referral identifier that uniquely identifies the referral, and recording in a referral database the resource description and the referral identifier; and receiving an indication a trigger event has occurred with respect to the opportunity and the resource, and in response, determining a referral fee according to the related referral-payment information, and generating information indicating that payment of the referral fee is due.

According to another aspect of the present invention, a method for soliciting referrals that includes receiving an opportunity description and related referral-payment information that represents terms for paying one or more resource-referral fees that vary according to one or more criteria, and in response, generating an opportunity identifier that uniquely identifies the opportunity and recording in an opportunity database the opportunity description, the related referral-payment information and the opportunity identifier; and receiving a search request and, in response, providing information from the opportunity database that is obtained from the opportunity description and the related referral-payment information.

According to yet another aspect of the present invention, a method for managing referrals that includes accepting a referral that identifies an opportunity and includes a resource description, and in response, generating a referral identifier that uniquely identifies the referral and recording in a referral database the resource description and the referral identifier; and receiving an indication that a trigger event has occurred with respect to the resource, and in response, determining a referral fee according to a plurality of fees and one or more criteria and generating information indicating that payment of the referral fee is due.

According to a further aspect of the present invention, a method for managing referrals that includes receiving a referring-party description and related information that includes one or more characteristics of the party; generating a party identifier that uniquely identifies the party; recording in a database the party description, the related information and the party identifier; and providing to the party a representation of the party identifier.

The various features of the present invention and its preferred embodiments may be better understood by referring to the following discussion and the accompanying drawings in which like reference numerals refer to like elements in the several figures. The contents of the following discussion and the drawings are set forth as examples only should not be understood to represent limitations upon the scope of the present invention.

MODES FOR CARRYING OUT THE INVENTION

A. Overview

Figure 3:
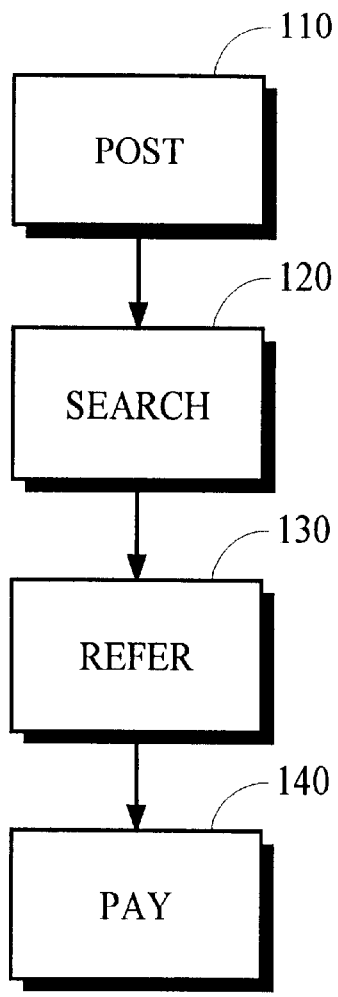
FIGS. 3 and 4 are block diagrams of illustrating various aspects of a referral management system according to the present invention.
Figure 4:
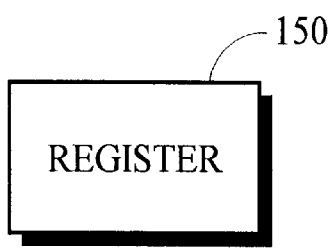

The present invention may be used to facilitate and manage the solicitation and submission of referrals. FIGS. 3 and 4 illustrate processes that may be used in a referral management system (RMS) to carry out various aspects of the present invention.

A first aspect of the present invention represented by POST 110 includes receiving from an "originator" information that describes an "opportunity" by either describing needs that can be fulfilled by a "resource" or by describing the desired resource itself, and that describes terms under which payment will be made to a "party" that refers one or more resources.

The originator is a person or other type of entity that decides to solicit referrals of resources that can potentially satisfy the opportunity. The originator can solicit referrals for its own opportunity or for the opportunity of another entity or person.

The opportunity may be essentially any type of need such as a need for an employee or contract worker, a need for unimproved or improved real estate such as a house, or a desire for a social acquaintance.

The party may be a person or other type of entity that decides to refer a resource that can potentially satisfy an opportunity. The party can refer itself or it can refer another entity or person.

A second aspect of the present invention represented by SEARCH 120 includes receiving a request from a party to search or browse published descriptions of opportunities and, in response, returning appropriate information to the party making the request.

A third aspect of the present invention represented by REFER 130 includes receiving information from a party that describes a resource that can potentially satisfy an opportunity.

A fourth aspect of the present invention represented by PAY 140 includes paying a party for a referral according to terms associated with an opportunity.

A fifth aspect of the present invention represented by REGISTER 150 includes receiving information describing a party that may subsequently submit a referral.

Several methods or processes that may be used to carry out these aspects of the present invention are discussed below. A few variations are presented that may be used in various combinations.

B. Processes

1. Posting an Opportunity

Figure 5:
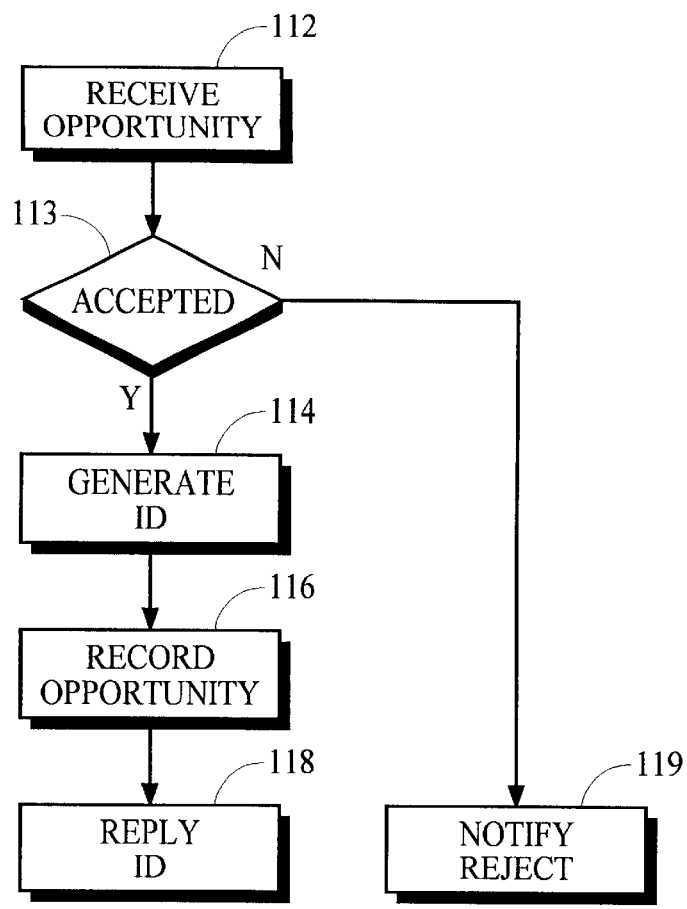
FIG. 5 is a block diagram of one method for receiving and recording opportunities.

FIG. 5 is a block diagram of one method that may be used to post opportunity descriptions. According to this method, step 112 receives information from an originator that describes an opportunity and provides referral-payment information that specifies the terms under which payments will be made for resource referrals. Preferably, the descriptive information includes a classification of the opportunity, discussed below, and any pertinent geographical information. This information may also include one or more acceptance criteria that must be satisfied before a referral is accepted, and one or more "trigger events" that specify when the payment of a referral fee to referring parties is due. Other types of information are discussed throughout this disclosure.

In employment applications, the opportunity classification mentioned above could be the field of employment, the type of position, and a likely range for salary or pay rate. In real estate applications, the opportunity classification could be commercial or residential, business or industrial, single- or multi-family residence, single- or multi-story, etc.

Step 113 determines whether the information submitted by the originator satisfies all criteria that must be satisfied before the opportunity description is accepted. The acceptance criteria, if any, for an opportunity description may be established as desired. For example, the acceptance criteria may require certain types of information or may require the originator to be registered, perhaps by paying a registration fee. In an alternative implementation, step 113 is omitted because no acceptance criterion is imposed and the method continues with step 114.

If the information submitted by the originator does not satisfy all acceptance criteria, step 119 notifies the originator that the submission has been rejected. Preferably, the notification informs the originator what criterion was not satisfied or how the criterion can be satisfied.

If the information submitted by the originator satisfies all acceptance criteria, step 114 generates an identifier that uniquely identifies the opportunity. This identifier as well as other identifiers disclosed herein may be obtained in any manner that provides unique identification. For example, the opportunity identifier may be derived from a monotonically increasing number such as a count of all opportunities accepted thus far, or it may be derived using information that is unique to the originator.

The identifier may be derived in a secure manner that prevents valid identifiers from being easily guessed. For example, the identifier may be derived with check codes or by hashing. Secure identifiers could be used by an originator to remain anonymous yet provide a way for a RMS to authenticate an originator for subsequent transactions such as picking up referrals. It is anticipated that, in preferred implementations, a RMS that permits an originator to remain anonymous at the time of posting would required that originator to divulge its identity to at least the operator of the RMS before referral information could be retrieved.

Step 116 records in an "opportunity database" information that describes the opportunity and the related referral-payment information, and the opportunity identifier. Any other information that pertains to this opportunity, such as the referral acceptance criteria mentioned above, may also be recorded.

Step 118 returns the opportunity identifier to the originator. Step 118 may be omitted in an alternative implementation; however, preferred implementations include this step because it confirms to the originator that the opportunity has been accepted and recorded.

2. Searching Opportunities

Figure 6:
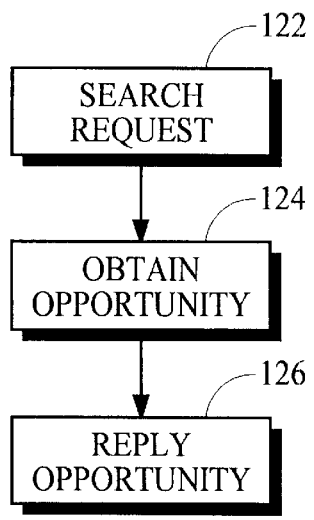
FIG. 6 is a block diagram of one method for receiving and responding to search requests of an opportunity database.

FIG. 6 is a block diagram of one method that may be used to search or browse posted opportunities. According to this method, step 122 receives a request from a party to search or browse opportunities that are posted in the opportunity database. If desired, this step may validate the syntax or content of the request and notify the party if the request is invalid. It is assumed herein for the sake of simplicity that the request is valid.

Step 124 fetches information from the opportunity database in response to the request. The request may pertain to the classification of the opportunity, to pertinent geographical information or to any other information that is recorded in the database. If desired, a RMS may support searches based on referral-payment criteria. Such searches would allow a party to identify those opportunities offering the most attractive referral payments. In an employment application, for example, a search could be based on the field of employment, years of experience required, type of employer and/or range of salary.

Step 126 returns a representation of the information fetched in step 124.

3. Referring Resources

Figure 7:
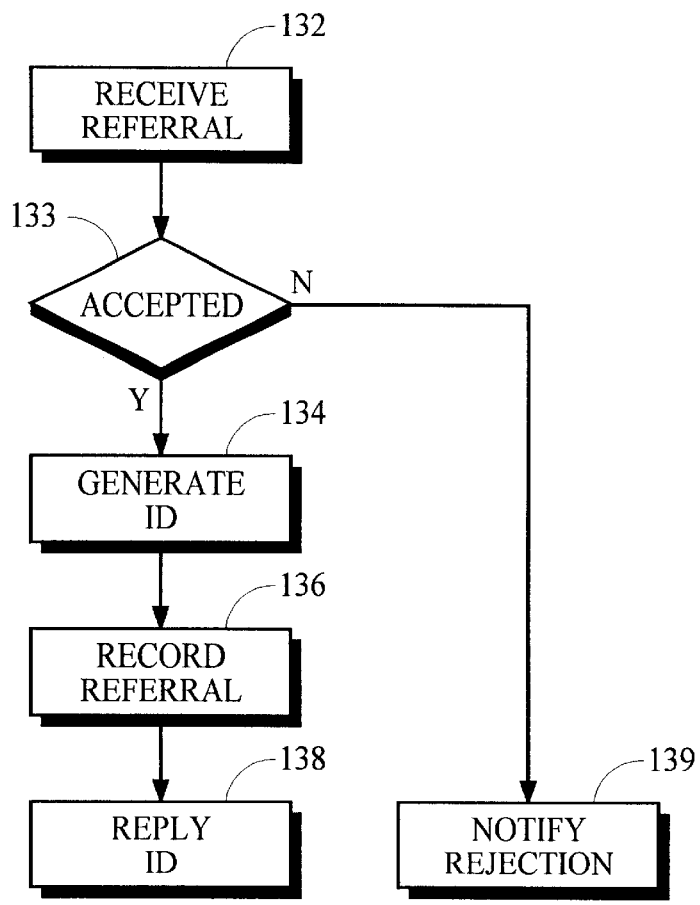
FIG. 7 is a block diagram of one method for receiving and recording referrals.

FIG. 7 is a block diagram of one method that may be used to submit a resource description as a referral. According to this method, step 132 receives information from a referring party that describes a resource and preferably identifies the opportunity for which the referral is being made. Preferably, this information also includes an identifier that uniquely identifies the referring party. An implementation that does not require a party identifier is described below.

Step 133 determines whether the information submitted by the party satisfies all criteria that must be satisfied before the referral is accepted. The acceptance criteria, if any, may be established by the originator or by the operator of the RMS, for example, and recorded in the opportunity database as described above. The acceptance criteria may require the referring party to be registered. In an employment application, for example, the acceptance criteria may restrict acceptance to only those referrals that include a resume for the referred person or that include an indication that the referred person is aware of and approves the referral.

In preferred implementations that accept resumes, information is extracted from the resumes in a manner that utilizes context-sensitive parsing to improve the accuracy and usefulness of the extracted information. Techniques for extracting information from resumes are disclosed in U.S. Pat. Nos. 5,164,899 and 5,197,004, both of which are incorporated herein by reference.

If the information submitted by the party does not satisfy all acceptance criteria, step 139 notifies the party that the referral has been rejected. Preferably, the notification informs the party what criterion was not satisfied or how the criterion can be satisfied.

If the referral submitted by the party satisfies all acceptance criteria, step 134 generates an identifier that uniquely identifies the referral. This referral identifier may be obtained in essentially any manner that uniquely identifies the referral including a derivation from a count of all referrals accepted thus far or from information that is unique to the party. A secure identifier may also be used to maintain the true identity of the referring party until required at a later time. This feature may be especially useful to parties who wish to refer themselves anonymously.

Preferably, a priority is assigned to referrals according to the order in which the referrals are accepted. This may be accomplished in a wide variety of ways such as by recording the date and time a referral is accepted. In implementations that derive a referral identifier from a monotonic sequence such as a count of accepted referrals, the identifier itself may used as an indication of priority. The priority can be used to resolve fee disputes between parties that refer the same resource.

Step 136 records in a "referral database" information that describes the referral, and the referral identifier. Any other information that pertains to this referral such as the referring party identifier may also be recorded.

Step 138 returns the referral identifier to the referring party. Step 138 may be omitted in any implementation that does not require the party to know the identifier; however, preferred implementations include this step because it confirms to the party that the referral has been accepted and recorded.

4. Making Payment

Figure 8:
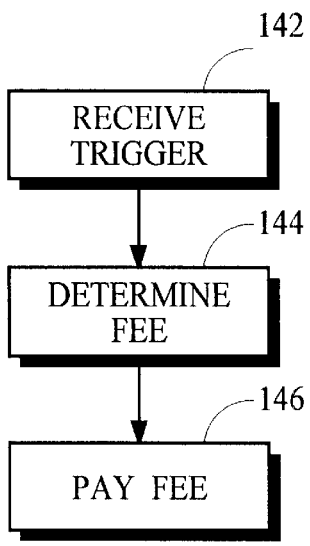
FIG. 8 is a block diagram of one method for initiating payment to a referring party in response to a trigger event associated with an opportunity.

FIG. 8 is a block diagram of one method that may be used to make payment to a referring party. According to this method, step 142 receives an indication that a "trigger event" for a particular opportunity has occurred. As explained above, a trigger event indicates when payment to a referring party is due.

A wide range of trigger events are possible. In an employment application, for example, a trigger event may occur when a person is called for a personal interview, is hired, or is hired and employed for a specified period of time such as three months. In a real estate application, a trigger event may occur when an offer is made to buy a property, when the owner of the property accepts an offer, or when the sale of a property is consummated. Essentially any trigger event may be specified. Furthermore, multiple trigger events may be specified for a particular opportunity.

Step 144 fetches referral-payment information from the opportunity database for the opportunity that is associated with the trigger event and determines the amount of payment that is due. The referral-payment information may indicate that the amount of payment varies according to one or more criteria. A few examples are discussed below that show essentially any fee-payment arrangement is possible.

A first example is a payment amount that varies as a function of the type of trigger event that has occurred. In an employment application, for example, a particular opportunity may be associated with trigger events for (1) a personal interview with a referred person before a position is filled, (2) hiring the referred person to fill the position, and (3) a satisfactory employee review after three months of employment. Progressively larger fees could be defined for each successive trigger event. In principle, any combination of trigger events and associated fees is possible.

A second example is a payment amount that varies as a function of the qualifications of the referred resource. An originator may post a list of resource criteria that is being sought to satisfy an opportunity and, for each criterion that is met, a fee can be specified. In an employment application, for example, resource criteria could include a specified number of years of related employment experience, a college degree in a related fee, and managerial experience.

A third example is a payment amount that varies according to characteristics of the person or entity that submitted a referral, or the amount of information that was included in the referral. Continuing the employment example, different fees could be specified according to whether the referring party is deemed to be a full-time or part-time employment recruiter, whether the party knows the referred person personally, whether the referred person was aware of and agreed to the referral, and whether the referring party provided a sufficiently detailed resume for the referred person. A schedule of fees could be established to encourage a referring party to provide more complete information about itself or about the referred resource.

Preferably, each referral is assigned a priority at the time it is accepted and that priority is used to resolve any disputes that may arise between parties that referred the same resource. In one implementation, the referral fee is paid to the party associated with the referral having the highest priority.

Step 146 generates information that may be printed or transmitted in some form that either provides notification of the amount that is due, or that initiates actual payment of the amount that is due. The content of the information and the recipient may be established uniformly for all opportunities posted in a referral management system, they may vary according to originator or party, or they may vary for each opportunity. A few examples are described in the following paragraphs.

In a first example, the operator of a RMS is responsible for payment. Step 146 either notifies the operator that payment is due or, alternatively, causes payment to be made by initiating one or more transactions in appropriate financial systems.

In a second example, the originator of an opportunity is responsibility for payment. Step 146 provides to the originator a notification of the amount of the fee that is due and the identity of the party to receive payment. Preferably, step 146 also provides a copy of this notification to the referring party.

In a third example, step 146 provides to the referring party a notification of the amount of the fee that is due and the person or entity that is responsible for payment. In this example, the referring party is expected to send an invoice to the responsible entity.

Preferably, step 146 also provides a copy of this notification to the person or entity responsible for payment.

5. Registering Referring Parties

In preferred implementations, referrals are accepted only from registered parties. If desired, registration could be encouraged by permitting only registered parties to search or browse the opportunity database.

Figure 9:
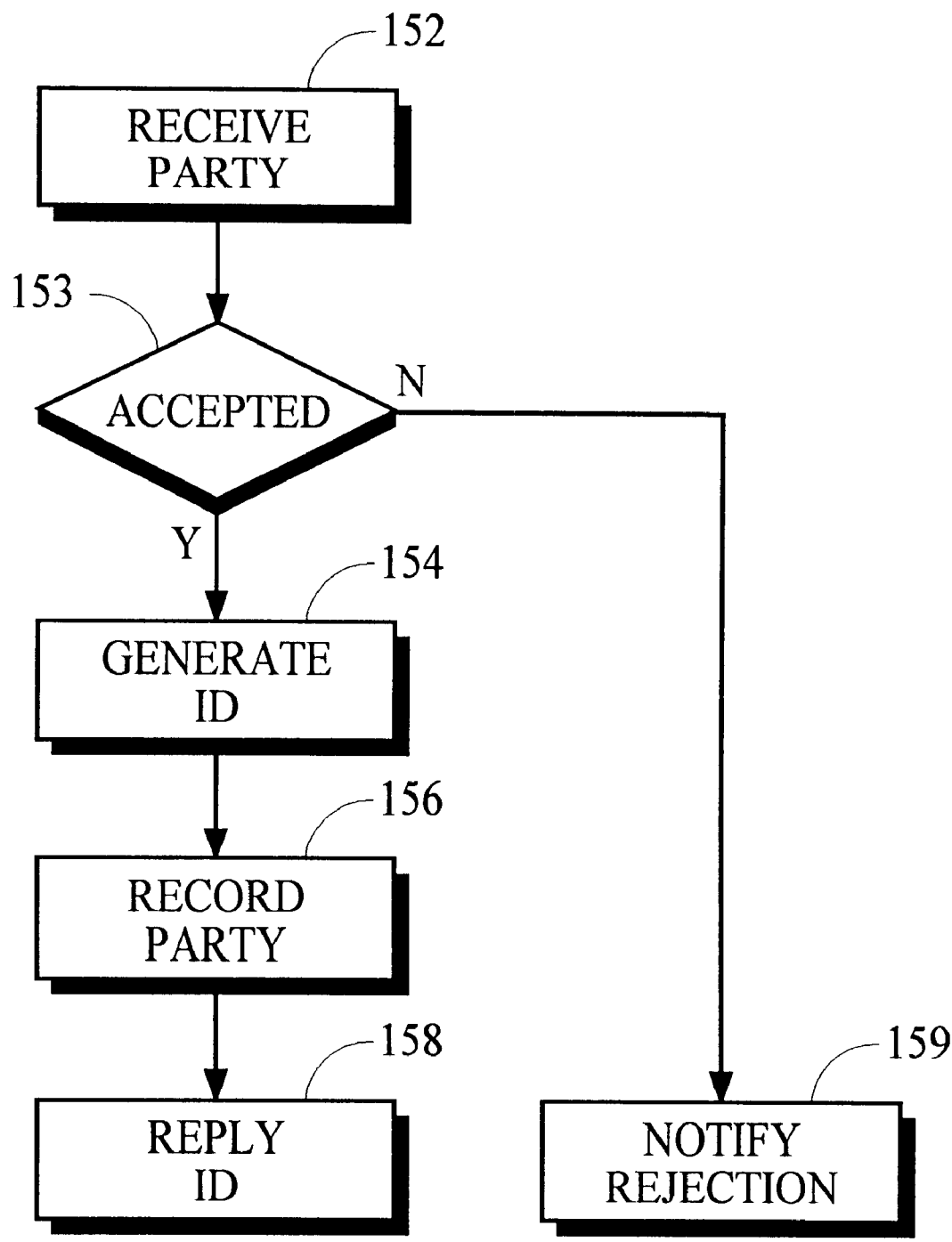
FIG. 9 is a block diagram of one method for registering referring parties.

FIG. 9 is a block diagram of one method that may be used to register referring parties. According to this method, step 152 receives information that describes a party wishing to register so that referrals may be submitted. Preferably, the descriptive information includes a classification of the party such as, for example, an indication of the field of the party's employment and some indication of work experience. If the party's field of employment is submitting referrals, the information could also indicate whether this work is full-time or part-time.

Incentives could be provided to encourage the party to provide additional information. For example, incentives could be provided by assigning parties to higher tiers or classifications in exchange for additional information, and making higher referral-payments available to the parties that are placed into these higher tiers or classifications.

Step 153 determines whether the information submitted by the party satisfies all criteria that must be satisfied before the party description is accepted for registration. The acceptance criteria, if any, for a party description may be established as desired. For example, the acceptance criteria may restrict acceptance to only those parties that are full-time recruiters or that provide a minimum amount of descriptive information about themselves. In an alternative implementation, step 153 is omitted because no acceptance criterion is imposed and the method continues with step 154.

If the information submitted by the party does not satisfy all acceptance criteria, step 159 notifies the party that the submission has been rejected. Preferably, the notification informs the party what criterion was not satisfied or how the criterion can be satisfied.

If the information submitted by the party satisfies all acceptance criteria, step 154 generates an identifier that uniquely identifies the party. This party identifier may be obtained in essentially any manner that uniquely identifies the party including a derivation from a count of all party registrations or from information that is unique to the party. Secure identifiers may be used if desired to preserve anonymity until such time as the true identity is required such as, for example, when a referral fee is to be paid.

Step 156 records in a "referring-party database" information that describes the party and the party identifier. Other information that pertains to this party may also be recorded.

Step 158 returns the party identifier to the party. Step 158 may be omitted in an alternative implementation; however, preferred implementations include this step because it confirms registration to the party.

C. Other Features

The features described below may be incorporated into implementations of the present invention as desired.

1. Party Rating

Referring parties may be rated and the ratings themselves may be used in a number of ways. A few implementations are mentioned briefly.

In one implementation, a referring party is paid a referral fee that is calculated at least in part based on a rating of the party. This may be accomplished by establishing a hierarchy of parties in which higher-rated parties are paid higher referral fees and lower-rated parties are paid lower referral fees. Alternatively, this may be accomplished by assigning each party a rating score that serves as a weighting factor in a fee calculation.

In a second implementation, parties with higher ratings receive referral-fee payments for a larger number of trigger events. In an employment application, for example, parties having the lowest ratings are paid a fee for each referral that is and remains employed for three months, whereas parties having the highest ratings are paid one fee for each referral that is called for an interview, paid a second fee for each referral that is hired, and are paid a third fee for each referral that remains employed for three months.

In a third implementation, an originator accepts referrals from only the parties that have a rating higher than a specified threshold.

The ratings may be established in essentially any matter. For example, the rating of a party may reflect the number of successful referrals the party has submitted, or it may reflect a success rate or percentage of successful referrals. The meaning of a "successful" referral may be established as desired. The rating may be based on an assessment by either the originator or by the referred resource or resource owner. A combination of factors may be used to establish a party rating.

2. Penalties

In addition to or instead of the party ratings discussed above, a party with a potential referral can be encouraged to submit only high-quality referrals by imposing a penalty on referral that are deemed to be of low quality. This penalty could be included in the ratings discussed above and/or it could be implemented by debiting a penalty fee from the party's account. These penalties would offset any referral fees the party might earn through successful referrals.

This penalty feature could be used to discourage a party from submitting large numbers of "garbage" referrals that the party does not know to be suitable. Any undesirable behavior, either by party or originator, may be subject to a penalty fee as desired.

3. Fee Splitting

An implementation of the present invention may facilitate referral-fee splitting between a referring party and another party. For example, a first party who searches the opportunity database does not know a suitable resource personally and decides to enlist the assistance of a second party who does know the resource personally. The first party solicits this assistance by offering to share a referral fee. The RMS may incorporate one or more features to facilitate fee splitting.

One feature allows the first party to record in the opportunity database a fee-splitting arrangement that is used by a RMS to determine the fee due to each party at the time a trigger event occurs. In other words, the RMS implements the fee-splitting arrangement.

A second feature allows the first party to submit a preliminary referral with incomplete information that, in effect, reserves the right to submit a referral for a particular resource. The second party, who agrees to a fee-splitting arrangement with the first party, submits additional information for the referred resource to complete the referral. For example, in an employment application, a first party discovers a posted opportunity in the opportunity database and recalls a person who the first party does not know well but believes to be a suitable candidate for referral. The first party submits a preliminary referral that identifies the person but the first person is not able to include all of the information that is requested by the originator. This preliminary referral is given priority over all subsequent referrals of this person. The first party then contacts a second party, negotiates a fee-splitting arrangement, and arranges for the second party to augment the preliminary referral by providing the missing information. The RMS could use the priority accorded the preliminary referral to prevent the second party from receiving a referral fee for referring the person directly, thereby avoiding the fee-splitting arrangement with the first party.

A third feature implements a tiered-marketing structure whereby referral fees are automatically allocated among a hierarchy of parties. It is anticipated that a system that implements such a feature either would require all referring parties to be sponsored by another party already registered in the system, thereby clearly defining the proper hierarchical relationship, or would require all referring parties to identify themselves clearly so that a party registered in the tiered-structure not could also register under an alias outside the structure to submit a referral that avoids fee splitting.

4. Auctions

An implementation of the present invention may. facilitate auctions. An originator may hold an auction in which parties bid for a chance to submit referrals. A party may hold an auction in which originators bid for a chance to receive a referral.

If an originator has an opportunity for which numerous parties have potential resources to refer, the originator may wish to hold an auction allowing the parties to bid down the fee that must be paid for a successful referral. The originator could accept referrals from the party who bid the lowest referral fees.

If party has a resource that is in great demand, the party may wish to hold an auction allowing originators to bid up the fee that must be paid for a successful referral. The party could then submit the referral to the originator who bid the highest referral fee.

5. Referral-Fee Database

An implementation of the present invention may provide a database of referral-fees that can be browsed or searched. On one hand, a referring party can search the database for opportunities that offer the highest referral fees. On the other hand, an originator can search the database to learn what fees are being offered by others and determine what referral fees should be offered for a new opportunity posting. The referral-fee database may be a part of the opportunity database.

6. Party Notification

An implementation of the present invention may include features that provide notification of various events. For example, a potential referring party can be notified of the posting of a new opportunity or the modification of an existing opportunity that meets one or more criteria. An originator can be notified of a new referral or the modification of an existing referral that is submitted in response to a posted opportunity. A party can be notified of the occurrence of a trigger event. Notification may be made in many ways including by conventional mail, by electronic mail, by facsimile, by electronic paging, or by telephone call using speech-synthesis technology.

7. Resource Checking

An implementation of the present invention can provide a feature that facilitates checking a referred resource. In an employment application, this feature would facilitate checking the references and former employers and co-workers of a referred person. This could be done by constructing a resource database of employee and employer information that is extracted from submitted opportunities and referrals. The resource database could be augmented from other sources of information sources to provide a more complete picture of who worked for whom and when. This database could be interrogated to either confirm information provided on resumes or to identify individuals that could be contacted to better assess the qualifications of a prospective employee. Resource-checking fees could be paid to encourage participation.

D. Implementation

Figure 1:
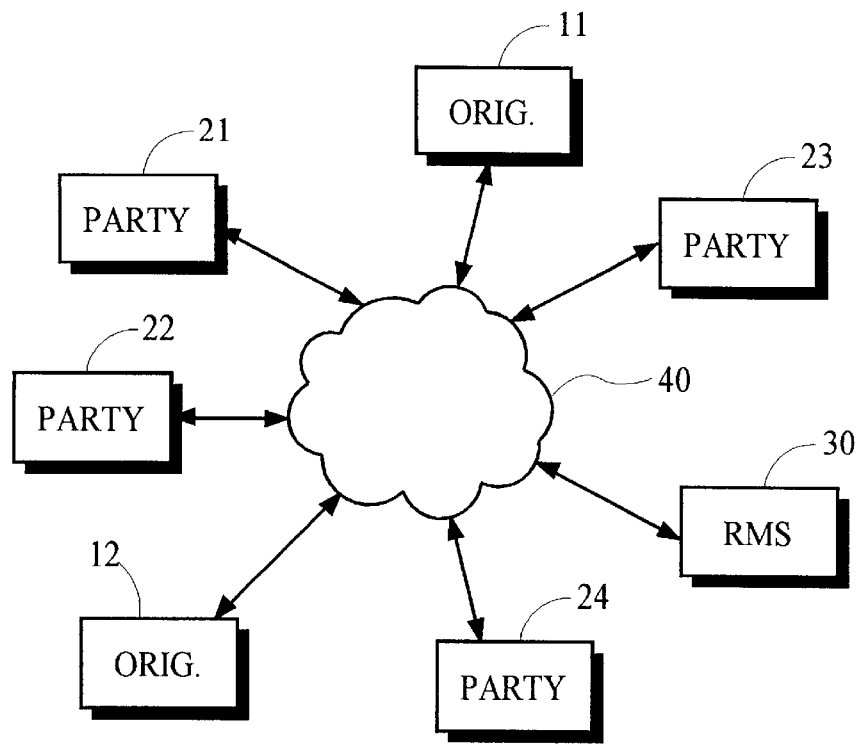
FIG. 1 is a block diagram of several computer systems including one computer providing referral management according to the present invention that are interconnected by a communication facility such as a network.

Various aspects of the present invention may be carried out by an arrangement such as that illustrated in FIG. 1, which is a block diagram of computer systems interconnected by communication facility 40 in the form of a network such as the Internet. Computer systems 11 and 12 each provide services to an originator that is an entity or person having an opportunity or need for one or more resources. Computer systems 21 to 24 each provide services to a party that is an entity or person that may refer one or more resources capable of satisfying the opportunity of an originator. Computer system 30 provides services to carry out various aspects of a RMS according to the present invention. Communication facility 40 may be essentially any facility such as a network, switch, or point-to-point communication path that allows computer system to communicate with one another. No particular feature of this arrangement is important to the present invention.

Figure 2:
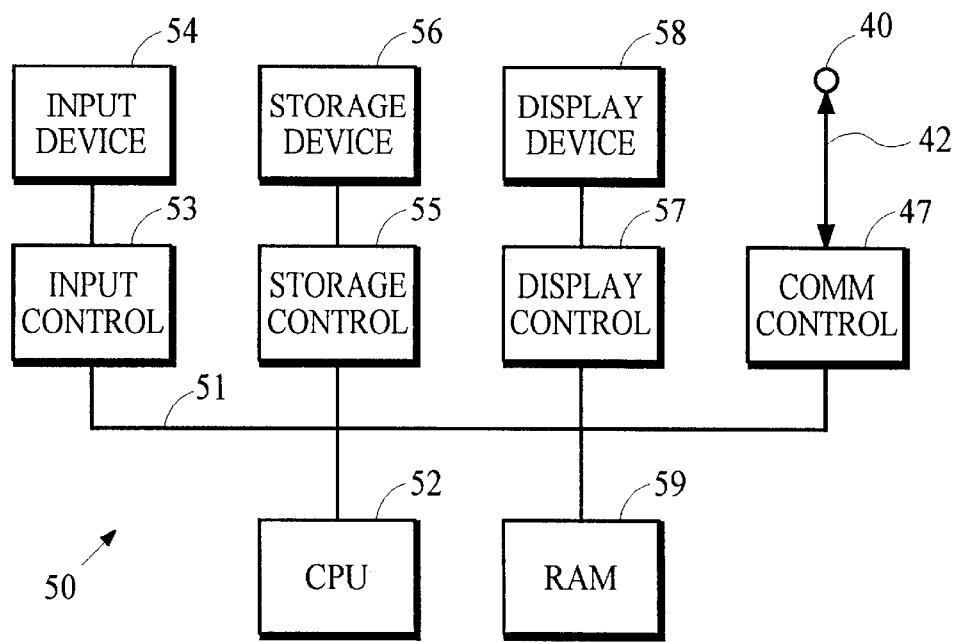
FIG. 2 is a block diagram of a computer system that may be used to carry out various aspects of the present invention.

FIG. 2 is a block diagram of computer system 50 that may be used to provide services to an originator, a party, or a referral management system. CPU 52 provides computing resources. Input control 53 represents an interface to input device 54 such as a keyboard or mouse. RAM 59 is system random access memory (RAM). Storage control 55 represents an interface to storage device 56 that includes a storage medium such as magnetic tape or disk, or an optical medium. The storage medium may be used to record programs of instructions for operating systems, utilities and applications, and may include embodiments of programs that implement various aspects of the present invention. In computer system 30, storage device 56 may also be used to record opportunity, party and resource information needed to provide a referral management system. Display control 57 provides an interface to display device 58. Communication control 47 represents an interface to communication channel 42 that connects to communication facility 40.

Throughout this disclosure, mention is made of separate opportunity, referral and party databases. Implementations of the present invention do not require distinct or separate databases for recorded information. For example, information may be recorded in tables or other structures that are incorporated into a single database. No particular organization of information is required.

In the embodiment shown, all major system components connect to bus 51, which may represent more than one physical bus. For example, some personal computers incorporate only one bus that conforms to the so called Industry Standard Architecture (ISA) or some variant of ISA. Other computers incorporate an additional bus such as a higher bandwidth bus conforming to some bus standard such as the Peripheral Component Interconnect (PCI) local bus standard. A bus architecture is not required to practice the present invention.

The features required to practice various aspects of the present invention can be performed by components that are implemented in a wide variety of ways including discrete logic components, one or more Application Specific Integrated Circuits (ASIC) and/or program-controlled processors. The manner in which these components are implemented is not important to the present invention. For example, the operations required to practice the present invention can be implemented in a computer system such as computer system 50 by programs of instructions that are stored in storage device 56, copied into RAM 59 and executed by CPU 52.

Such software may be conveyed by a variety of machine readable media including magnetic tape, magnetic disk, optical disc, and baseband or modulated communication paths throughout the spectrum including from supersonic to ultraviolet frequencies. Various aspects can also be implemented in various components of computer system 50 by processing circuitry such as ASICs, general-purpose integrated circuits, microprocessors controlled by programs embodied in various forms of read-only memory (ROM) or RAM, and other techniques.

What is claimed is:

1. A method for managing referrals that comprises:
    (a) receiving an opportunity description and related referral-payment information, wherein the opportunity description describes an opportunity and wherein the referral-payment information represents terms for paying a resource-referral fee, and in response thereto,
        (1) generating an opportunity identifier that uniquely identifies the opportunity, and
        (2) recording in an opportunity database the opportunity description, the related referral-payment information and the opportunity identifier;
    (b) receiving a search request and, in response thereto, providing information from the opportunity database that is obtained from the opportunity description and the related referral-payment information;
    (c) accepting a referral that includes a resource description that describes a resource, and in response thereto,
        (1) generating a referral identifier that uniquely identifies the referral, and
        (2) recording in a referral database the resource description and the referral identifier; and
    (d) receiving an indication that a trigger event has occurred with respect to the opportunity and the resource, and in response thereto,
        (1) determining a referral fee according to the related referral-payment information, and
        (2) generating information indicating that payment of the referral fee is due.

2. A method according to claim 1 wherein the opportunity is an employment opportunity and the resource is a potential employee.

3. A method according to claim 2 wherein the referral includes a resume and the method comprises extracting information from the resume to identify resource qualifications.

4. A method according to claim 1 wherein the referral-payment information includes indications of the referral fee, resource qualifications needed to satisfy the opportunity, and the trigger event.

5. A method according to claim 1 that comprises determining whether the referral satisfies one or more acceptance requirements, accepting the referral only if all acceptance requirements are satisfied, and rejecting the referral otherwise.

6. A method according to claim 1 that comprises generating in response to the trigger event an invoice for payment by an entity that is responsible for the opportunity.

7. A method according to claim 1 that receives the opportunity description, the search request, referral, and indication of the trigger event by way of a computer network.

8. A method according to claim 1 that comprises:
    obtaining resource information recorded in the opportunity database and/or the referral database that identifies relationships between employers and employees; and
    recording in a resource database one or more records that represent the resource information.

9. A method according to claim 8 that comprises receiving a search request that identifies an employee or an employer and, in response thereto, providing information from the resource database that represents people who worked with or were associated with the employee or who worked at or for the employer.

10. A method for soliciting referrals that comprises:
    (a) receiving an opportunity description and related referral-payment information, wherein the opportunity description describes an opportunity and wherein the referral-payment information represents terms for paying one or more resource-referral fees that vary according to one or more criteria, and in response thereto,
        (1) generating an opportunity identifier that uniquely identifies the opportunity, and
        (2) recording in an opportunity database the opportunity description, the related referral-payment information and the opportunity identifier; and
    (b) receiving a search request and, in response thereto, providing information from the opportunity database that is obtained from the opportunity description and the related referral-payment information.

11. A method according to claim 10 wherein the one or more criteria are one or more characteristics of a party who refers a resource that may satisfy the opportunity.

12. A method according to claim 11 wherein the one or more characteristics are one or more measures of relevance of resources referred by the party.

13. A method according to claim 12 wherein the one or more measures of relevance include statistics of resources referred by the party that were accepted to satisfy opportunities.

14. A method according to claim 12 wherein the one or more measures of relevance include statistics of resources referred by the party that passed one or more criteria for consideration to satisfy opportunities.

15. A method according to claim 11 wherein the one or more characteristics pertain to employment history of the party.

16. A method according to claim 15 wherein the employment history pertains to relevance between the opportunity and the party's employment.

17. A method according to claim 15 wherein the employment history includes a measure of referral activity for the party.

18. A method according to claim 11 wherein the one or more characteristics pertain to knowledge the party has of the resource that is based on one or more relationships that exist between the party and the resource.

19. A method according to claim 18 wherein the one or more relationships are commercial relationships.

20. A method according to claim 18 wherein the one or more relationships are personal non-commercial relationships.

21. A method according to claim 10 wherein the one or more criteria are one or more characteristics of a referred resource that may satisfy the opportunity.

22. A method according to claim 21 wherein the one or more characteristics include whether or not the resource or resource owner approves a referral of the resource.

23. A method according to claim 21 wherein the one or more characteristics include measures of adequacy to satisfy the opportunity.

24. A method according to claim 10 that comprises:
obtaining resource information recorded in the opportunity database that identifies relationships between employers and employees; and
recording in a resource database one or more records that represent the resource information.

25. A method according to claim 24 that comprises receiving a search request that identifies an employee or an employer and, in response thereto, providing information from the resource database that represents people who worked with or were associated with the employee or who worked at or for the employer.

26. A method for managing referrals that comprises:
(a) accepting a referral that identifies an opportunity and includes a resource description that describes a resource, and in response thereto,
(1) generating a referral identifier that uniquely identifies the referral, and
(2) recording in a referral database the resource description and the referral identifier; and
(b) receiving an indication that a trigger event has occurred with respect to the resource, and in response thereto,
(1) determining a referral fee according to a plurality of fees and one or more criteria, and
(2) generating information indicating that payment of the referral fee is due.

27. A method according to claim 26 that comprises recording information representing one or more characteristics of the party, wherein the one or more criteria include the one or more characteristics of the party.

28. A method according to claim 27 wherein the one or more characteristics are one or more measures of relevance of resources referred by the party.

29. A method according to claim 28 wherein the one or more measures of relevance include statistics of resources referred by the party that were accepted to satisfy opportunities.

30. A method according to claim 28 wherein the one or more measures of relevance include statistics of resources referred by the party that passed one or more criteria for consideration to satisfy opportunities.

31. A method according to claim 27 wherein the one or more characteristics pertain to employment history of the party.

32. A method according to claim 31 wherein the employment history pertains to relevance between the opportunity and the party's employment.

33. A method according to claim 31 wherein the employment history includes a measure of referral activity for the party.

34. A method according to claim 27 wherein the one or more characteristics pertain to knowledge the party has of the resource that is based on one or more relationships that exist between the party and the resource.

35. A method according to claim 34 wherein the one or more relationships are commercial relationships.

36. A method according to claim 34 wherein the one or more relationships are personal non-commercial relationships.

37. A method according to claim 26 that comprises recording information representing one or more characteristics of the resource, wherein the one or more criteria include one or more characteristics of the resource.

38. A method according to claim 37 wherein the one or more characteristics include whether or not the resource or resource owner approves a referral of the resource by the party.

39. A method according to claim 37 wherein the one or more characteristics include measures of adequacy to satisfy the opportunity.

40. A method according to claim 26 that comprises receiving a search request and, in response, providing from the referral database representations of resource descriptions for those resources that satisfy one or more criteria.

41. A method according to claim 40 that comprises recording information representing one or more characteristics of parties referring resources, wherein the one or more criteria include the one or more characteristics of the parties.

42. A method according to claim 41 wherein the one or more characteristics are one or more measures of relevance of resources referred by the party.

43. A method according to claim 41 wherein the one or more characteristics pertain to employment history of the party.

44. A method according to claim 41 wherein the one or more characteristics pertain to knowledge the party has of the resource that is based on one or more relationships that exist between the party and the resource.

45. A method according to claim 40 that comprises recording information representing one or more characteristics of referred resources, wherein the one or more criteria include whether or not a respective resource or resource owner approves a referral of the resource by the party.

46. A method according to claim 26 that comprises assigning a priority to a referral based on when that referral is accepted.

47. A method according to claim 46 that comprises identifying a recipient for the referral fee according to the highest priority of multiple referrals that referred the resource.

48. A method according to claim 26 that comprises checking information included in the referral to determine if the referral is complete and, in response to determining the referral is incomplete, subsequently accepting additional information that completes the referral and recording the additional information in the referral database.

49. A method according to claim 48 wherein the additional information is provided by a second party.

50. A method according to claim 26 that comprises:
   obtaining resource information recorded in the referral database that identifies relationships between employers and employees; and
   recording in a resource database one or more records that represent the resource information.

51. A method according to claim 50 that comprises receiving a search request that identifies an employee or an employer and, in response thereto, providing information from the resource database that represents people who worked with or were associated with the employee or who worked at or for the employer.

52. A method for managing referrals that comprises:
   receiving a referring-party description and related information, wherein the referring-party description describes a party and wherein the related information includes one or more characteristics of the party; wherein the one or more characteristics are one or more measures of relevance of resources referred by the party;
   generating a party identifier that uniquely identifies the party;
   recording in a database the party description, the related information and the party identifier; and
   providing to the party a representation of the party identifier.

53. A method according to claim 52 wherein the one or more measures of relevance include statistics of resources referred by the party that were accepted to satisfy opportunities.

54. A method according to claim 52 wherein the one or more measures of relevance include statistics of resources referred by the party that passed one or more criteria for consideration to satisfy opportunities.

55. A method according to claim 52 wherein the one or more characteristics pertain to employment history of the party.

56. A method according to claim 55 wherein the employment history pertains to the party's field of employment.

57. A method according to claim 55 wherein the employment history includes a measure of referral activity for the party.

58. A method according to claim 52 wherein the one or more characteristics pertain to knowledge the party has of a referred resource that is based on one or more relationships that exist between the party and the resource.

59. A method according to claim 58 wherein the one or more relationships are commercial relationships.

60. A method according to claim 58 wherein the one or more relationships are personal non-commercial relationships.

61. A medium readable by a device and conveying a program of instructions for execution by the device to perform a method for managing referrals, wherein the method comprises:
   (a) receiving an opportunity description and related referral-payment information, wherein the opportunity description describes an opportunity and wherein the referral-payment information represents terms for paying a resource-referral fee, and in response thereto,
      (1) generating an opportunity identifier that uniquely identifies the opportunity, and
      (2) recording in an opportunity database the opportunity description, the related referral-payment information and the opportunity identifier;
   (b) receiving a search request and, in response thereto, providing information from the opportunity database that is obtained from the opportunity description and the related referral-payment information;
   (c) accepting a referral that includes a resource description that describes a resource, and in response thereto,
      (1) generating a referral identifier that uniquely identifies the referral, and
      (2) recording in a referral database the resource description and the referral identifier; and
   (d) receiving an indication that a trigger event has occurred with respect to the opportunity and the resource, and in response thereto,
      (1) determining a referral fee according to the related referral payment information, and
      (2) generating information indicating that payment of the referral fee is due.

62. A medium according to claim 61 wherein the opportunity is an employment opportunity and the resource is a potential employee.

63. A medium according to claim 62 wherein the referral includes a resume and the method comprises extracting information from the resume to identify resource qualifications.

64. A medium according to claim 61 wherein the referral-payment information includes indications of the referral fee, resource qualifications needed to satisfy the opportunity, and the trigger event.

65. A medium according to claim 61 that comprises determining whether the referral satisfies one or more acceptance requirements, accepting the referral only if all acceptance requirements are satisfied, and rejecting the referral otherwise.

66. A medium according to claim 61 that comprises generating in response to the trigger event an invoice for payment by an entity that is responsible for the opportunity.

67. A medium according to claim 61 that receives the opportunity description, the search request, referral, and indication of the trigger event by way of a computer network.

68. A medium according to claim 61 that comprises:
   obtaining resource information recorded in the opportunity database and/or the referral database that identifies relationships between employers and employees; and
   recording in a resource database one or more records that represent the resource information.

69. A medium according to claim 68 that comprises receiving a search request that identifies an employee or an employer and, in response thereto, providing information from the resource database that represents people who worked with or were associated with the employee or who worked at or for the employer.

70. A medium readable by a device and conveying a program of instructions for execution by the device to perform a method for soliciting referrals, wherein the method comprises:
   (a) receiving an opportunity description and related referral-payment information, wherein the opportunity description describes an opportunity and wherein the referral-payment information represents terms for paying one or more resource-referral fees that vary according to one or more criteria, and in response thereto,
(1) generating an opportunity identifier that uniquely identifies the opportunity, and
(2) recording in an opportunity database the opportunity description, the related referral-payment information and the opportunity identifier; and
(b) receiving a search request and, in response thereto, providing information from the opportunity database that is obtained from the opportunity description and the related referral-payment information.

71. A medium according to claim 70 wherein the one or more criteria are one or more characteristics of a party who refers a resource that may satisfy the opportunity.

72. A medium according to claim 71 wherein the one or more characteristics are one or more measures of relevance of resources referred by the party.

73. A medium according to claim 72 wherein the one or more measures of relevance include statistics of resources referred by the party that were accepted to satisfy opportunities.

74. A medium according to claim 72 wherein the one or more measures of relevance include statistics of resources referred by the party that passed one or more criteria for consideration to satisfy opportunities.

75. A medium according to claim 71 wherein the one or more characteristics pertain to employment history of the party.

76. A medium according to claim 75 wherein the employment history pertains to relevance between the opportunity and the party's employment.

77. A medium according to claim 75 wherein the employment history includes a measure of referral activity for the party.

78. A medium according to claim 71 wherein the one or more characteristics pertain to knowledge the party has of the resource that is based on one or more relationships that exist between the party and the resource.

79. A medium according to claim 78 wherein the one or more relationships are commercial relationships.

80. A medium according to claim 78 wherein the one or more relationships are personal non-commercial relationships.

81. A medium according to claim 70 wherein the one or more criteria are one or more characteristics of a referred resource that may satisfy the opportunity.

82. A medium according to claim 81 wherein the one or more characteristics include whether or not the resource or resource owner approves a referral of the resource.

83. A medium according to claim 81 wherein the one or more characteristics include measures of adequacy to satisfy the opportunity.

84. A medium according to claim 70 that comprises:
obtaining resource information recorded in the opportunity database that identifies relationships between employers and employees; and
recording in a resource database one or more records that represent the resource information.

85. A medium according to claim 84 that comprises receiving a search request that identifies an employee or an employer and, in response thereto, providing information from the resource database that represents people who worked with or were associated with the employee or who worked at or for the employer.

86. A medium readable by a device and conveying a program of instructions for execution by the device to perform a method for managing referrals, wherein the method comprises:
(a) accepting a referral that identifies an opportunity and includes a resource description that describes a resource, and in response thereto,
(1) generating a referral identifier that uniquely identifies the referral, and
(2) recording in a referral database the resource description and the referral identifier; and
(b) receiving an indication that a trigger event has occurred with respect to the resource, and in response thereto,
(1) determining a referral fee according to a plurality of fees and one or more criteria, and
(2) generating information indicating that payment of the referral fee is due.

87. A medium according to claim 86 that comprises recording information representing one or more characteristics of the party, wherein the one or more criteria include the one or more characteristics of the party.

88. A medium according to claim 87 wherein the one or more characteristics are one or more measures of relevance of resources referred by the party.

89. A medium according to claim 88 wherein the one or more measures of relevance include statistics of resources referred by the party that were accepted to satisfy opportunities.

90. A medium according to claim 88 wherein the one or more measures of relevance include statistics of resources referred by the party that passed one or more criteria for consideration to satisfy opportunities.

91. A medium according to claim 87 wherein the one or more characteristics pertain to employment history of the party.

92. A medium according to claim 91 wherein the employment history pertains to relevance between the opportunity and the party's employment.

93. A medium according to claim 91 wherein the employment history includes a measure of referral activity for the party.

94. A medium according to claim 87 wherein the one or more characteristics pertain to knowledge the party has of the resource that is based on one or more relationships that exist between the party and the resource.

95. A medium according to claim 94 wherein the one or more relationships are commercial relationships.

96. A medium according to claim 94 wherein the one or more relationships are personal non-commercial relationships.

97. A medium according to claim 86 that comprises recording information representing one or more characteristics of the resource, wherein the one or more criteria include one or more characteristics of the resource.

98. A medium according to claim 97 wherein the one or more characteristics include whether or not the resource or resource owner approves a referral of the resource by the party.

99. A medium according to claim 97 wherein the one or more characteristics include measures of adequacy to satisfy the opportunity.

100. A medium according to claim 86 that comprises receiving a search request and, in response, providing from the referral database representations of resource descriptions for those resources that satisfy one or more criteria.

101. A medium according to claim 100 that comprises recording information representing one or more characteristics of parties referring resources, wherein the one or more criteria include the one or more characteristics of the parties.

102. A medium according to claim 101 wherein the one or more characteristics are one or more measures of relevance of resources referred by the party.

103. A medium according to claim 101 wherein the one or more characteristics pertain to employment history of the party.

104. A medium according to claim 101 wherein the one or more characteristics pertain to knowledge the party has of the resource that is based on one or more relationships that exist between the party and the resource.

105. A medium according to claim 100 that comprises recording information representing one or more characteristics of referred resources, wherein the one or more criteria include whether or not a respective resource or resource owner approves a referral of the resource by the party.

106. A medium according to claim 86 that comprises assigning a priority to a referral based on when that referral is accepted.

107. A medium according to claim 106 that comprises identifying a recipient for the referral fee according to the highest priority of multiple referrals that referred the resource.

108. A medium according to claim 86 that comprises checking information included in the referral to determine if the referral is complete and, in response to determining the referral is incomplete, subsequently accepting additional information that completes the referral and recording the additional information in the referral database.

109. A medium according to claim 108 wherein the additional information is provided by a second party.

110. A medium according to claim 86 that comprises:
obtaining resource information recorded in the referral database that identifies relationships between employers and employees; and
recording in a resource database one or more records that represent the resource information.

111. A medium according to claim 110 that comprises receiving a search request that identifies an employee or an employer and, in response thereto, providing information from the resource database that represents people who worked with or were associated with the employee or who worked at or for the employer.

112. A medium readable by a device and conveying a program of instructions for execution by the device to perform a method for managing referrals, wherein the method comprises:
receiving a referring-party description and related information, wherein the referring-party description describes a party and wherein the related information includes one or more characteristics of the party; wherein the one or more characteristics are one or more measures of relevance of resources referred by the party;
generating a party identifier that uniquely identifies the party;
recording in a database the party description, the related information and the party identifier; and
providing to party a representation of the party identifier.

113. A medium according to claim 112 wherein the one or more measures of relevance include statistics of resources referred by the party that were accepted to satisfy opportunities.

114. A medium according to claim 112 wherein the one or more measures of relevance include statistics of resources referred by the party that passed one or more criteria for consideration to satisfy opportunities.

115. A medium according to claim 112 wherein the one or more characteristics pertain to employment history of the party.

116. A medium according to claim 115 wherein the employment history pertains to the party's field of employment.

117. A medium according to claim 115 wherein the employment history includes a measure of referral activity for the party.

118. A medium according to claim 112 wherein the one or more characteristics pertain to knowledge the party has of a referred resource that is based on one or more relationships that exist between the party and the resource.

119. A medium according to claim 118 wherein the one or more relationships are commercial relationships.

120. A medium according to claim 118 wherein the one or more relationships are personal non-commercial relationships.

* * * * *